US012679157B2

(12) United States Patent
Taguchi et al.

(10) Patent No.: US 12,679,157 B2
(45) Date of Patent: Jul. 14, 2026

(54) VEHICLE CONTROL APPARATUS AND VEHICLE CONTROL SYSTEM

(71) Applicant: Hitachi Astemo, Ltd., Hitachinaka (JP)

(72) Inventors: Atsushi Taguchi, Hitachinaka (JP); Ryusuke Hirao, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 226 days.

(21) Appl. No.: 18/576,493

(22) PCT Filed: Jul. 6, 2022

(86) PCT No.: PCT/JP2022/026778
§ 371 (c)(1),
(2) Date: Aug. 16, 2024

(87) PCT Pub. No.: WO2023/282275
PCT Pub. Date: Jan. 12, 2023

(65) Prior Publication Data
US 2025/0010679 A1    Jan. 9, 2025

(51) Int. Cl.
*B60G 17/015* (2006.01)
*B60G 17/019* (2006.01)

(52) U.S. Cl.
CPC ....... *B60G 17/0152* (2013.01); *B60G 17/019* (2013.01)

(58) Field of Classification Search
CPC .............. B60G 17/0152; B60G 17/019; B60G 17/0164; B60G 17/08; B60G 17/0162;
(Continued)

(56) References Cited

U.S. PATENT DOCUMENTS 4,789,935 A * 12/1988 Buma ................ B60G 21/0556
701/37
5,060,157 A * 10/1991 Tado .................. B60G 17/0182
701/40
(Continued)

FOREIGN PATENT DOCUMENTS

JP        2000-168329      6/2000
JP        2004-182031      7/2004
(Continued)

OTHER PUBLICATIONS

International Search Report dated Aug. 16, 2022 in International Application No. PCT/JP2022/026778, with English translation.
(Continued)

*Primary Examiner* — Kurt Philip Liethen
(74) *Attorney, Agent, or Firm* — Wenderoth, Lind & Ponack, L.L.P.

(57) ABSTRACT

An ECU includes a posture stability control portion configured to determine an instruction value for controlling a variable damper according to an input change in a posture of a vehicle, a ride comfort control portion configured to determine an instruction value for controlling the variable damper according to an input sprung vibration of the vehicle, and an instruction value calculation portion configured to determine an instruction value directed to the variable damper based on both the instruction values of the posture stability control portion and the ride comfort control portion. The instruction value calculation portion prioritizes the instruction value of the ride comfort control portion when a value indicating the change in the posture of the vehicle is equal to or larger than a predetermined value and a value indicating a sprung vibration in a sprung resonance frequency band is larger than a predetermined value.

9 Claims, 12 Drawing Sheets

(58) Field of Classification Search
CPC ........ B60G 2400/102; B60G 2400/104; B60G
2400/106; B60G 2400/204; B60G
2400/32; B60G 2400/37; B60G 2400/41;
B60G 2500/10; B60G 2800/012; B60G
2800/014; B60G 17/0165; B60G 17/018;
B60G 2400/05; B60G 2800/01; B60Y
2400/86
See application file for complete search history.

(56) References Cited

U.S. PATENT DOCUMENTS

| | | | | | |
|---|---|---|---|---|---|
| 5,691,899 | A * | 11/1997 | Terasaki | ............. | B60G 17/0162 |
| | | | | | 280/5.507 |
| 7,311,316 | B2 * | 12/2007 | Yasui | ................. | B60G 21/0555 |
| | | | | | 280/5.506 |
| 11,766,911 | B2 * | 9/2023 | Coerman | ........... | B60G 17/0165 |
| | | | | | 280/5.519 |
| 2006/0047387 | A1 * | 3/2006 | Izawa | ................. | B60G 17/0182 |
| | | | | | 701/37 |
| 2010/0025946 | A1 * | 2/2010 | Inoue | ..................... | B60G 15/08 |
| | | | | | 280/6.157 |
| 2011/0025000 | A1 * | 2/2011 | Inoue | ................. | B60G 17/0157 |
| | | | | | 280/5.507 |
| 2013/0166149 | A1 * | 6/2013 | Liu | ....................... | B60G 17/015 |
| | | | | | 701/37 |
| 2014/0379215 | A1 * | 12/2014 | Kikuchi | ............... | B60G 17/018 |
| | | | | | 701/37 |
| 2018/0361813 | A1 * | 12/2018 | Ohno | ................. | B60G 17/0157 |
| 2020/0023705 | A1 | 1/2020 | Hirao et al. | | |

FOREIGN PATENT DOCUMENTS

| | | | | |
|---|---|---|---|---|
| JP | 2018-047722 | | 3/2018 | |
| JP | 2018047722 A | * | 3/2018 | ........... B60G 17/015 |
| WO | 2018/155541 | | 8/2018 | |

OTHER PUBLICATIONS

Written Opinion of the International Searching Authority issued Aug. 16, 2022 in International Application No. PCT/JP2022/026778, with English translation.

* cited by examiner

VEHICLE CONTROL APPARATUS AND VEHICLE CONTROL SYSTEM

TECHNICAL FIELD

The present disclosure relates to a vehicle control apparatus and a vehicle control system configured to control an actuator that changes a force for suppressing a relative displacement between a vehicle body and a wheel.

BACKGROUND ART

PTL 1 discloses a control apparatus that suppresses a floating sensation by speeding up vibration convergence when a large vibration is input while preventing deterioration of ride comfort in reaction to a high-frequency input from a road surface with the aid of a control dead zone. Further, PTL 1 discloses that the control apparatus improves deterioration of the vibration damping performance at an initial stage of occurrence of a vehicle vertical behavior due to the provision of the control dead zone, thereby suppressing the vehicle vertical behavior with a sufficiently high damping force even against a large vehicle vertical behavior such as a behavior exhibited while the vehicle is running on an undulation road surface and thus ensuring posture stability without impairing the ride comfort when the vehicle runs normally.

CITATION LIST

Patent Literature

PTL 1: Japanese Patent Application Laid-Open No. 2000-168329

SUMMARY OF INVENTION

Technical Problem

However, according to the control apparatus disclosed in PTL 1, the input from the road surface falls within a predetermined range and a change in the posture of the vehicle also falls within a predetermined range when, for example, the vehicle is turned, braked, or driven on the undulation road surface. If the posture stability control is selected at this time, the vibration damping performance may reduce.

Solution to Problem

One of objects of the present invention is to provide a vehicle control apparatus and a vehicle control system capable of achieving both ride comfort of a vehicle and posture stability and increasing a vibration damping performance.

According to one aspect of the present invention, a vehicle control apparatus is configured to control an actuator provided between a vehicle body and a wheel of a vehicle. The actuator is configured to change a force for suppressing a relative displacement between the vehicle body and the wheel. The vehicle control apparatus includes a posture stability control portion configured to determine an instruction value for controlling the actuator according to an input change in a posture of the vehicle, a ride comfort control portion configured to determine an instruction value for controlling the actuator according to an input sprung vibration of the vehicle, and an instruction value calculation portion configured to determine an instruction value directed to the actuator based on both the instruction values of the posture stability control portion and the ride comfort control portion. The instruction value calculation portion prioritizes the instruction value of the ride comfort control portion when a value indicating the change in the posture of the vehicle is equal to or larger than a predetermined value and a value indicating a sprung vibration in a sprung resonance frequency band is larger than a predetermined value.

According to one aspect of the present invention, a vehicle control system includes a force generation mechanism configured to adjust a force between a vehicle body and a wheel of a vehicle, a sprung state detection portion configured to detect or estimate a sprung vibration, a vehicle posture detection portion configured to detect or estimate a change in a sprung posture, and a controller configured to perform control so as to weaken the force to be generated by the force generation mechanism when a value indicating the change in the sprung posture and a value indicating a sprung vibration in a sprung resonance frequency band transition from smaller states to larger states than respective predetermined values.

According to the aspects of the present invention, both the ride comfort of the vehicle and the posture stability can be achieved and the vibration damping performance can be improved.

DESCRIPTION OF EMBODIMENTS

In the following description, vehicle control apparatuses and vehicle control systems according to embodiments of the present invention will be described in detail with reference to the accompanying drawings, citing an example in which they are applied to, for example, a four-wheeled automobile.

Figure 1:
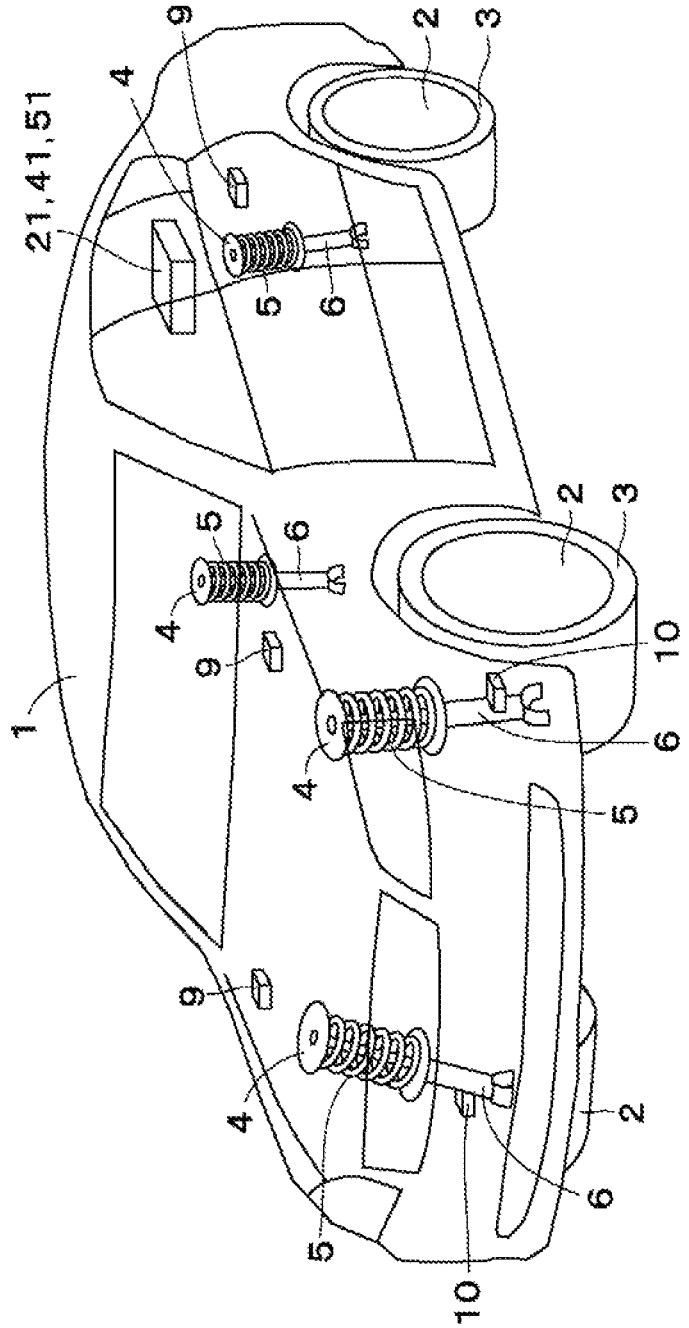
FIG. 1 illustrates an overall configuration indicating a four-wheeled automobile to which ECUs according to embodiments of the present invention are applied.
Figure 2:
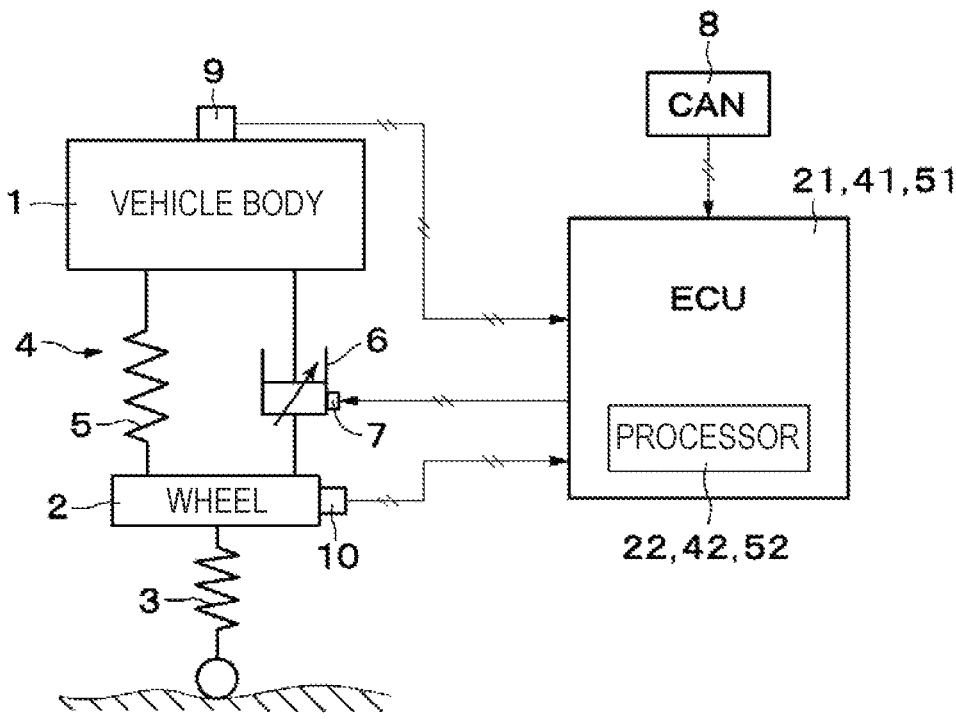
FIG. 2 schematically illustrates a shock absorber mounted on the automobile illustrated in FIG. 1.

Then, FIGS. 1 to 10 illustrate a first embodiment of the present invention. In FIGS. 1 and 2, a vehicle body 1 forms a main structure of the vehicle. For example, left and right front wheels and left and right rear wheels (hereinafter collectively referred to as wheels 2) are provided under the vehicle body 1. These wheels 2 each include a tire 3. The tire 3 functions as a spring that absorbs fine roughness of a road surface. The vehicle body 1 and the wheels 2 constitute the vehicle.

A suspension apparatus 4 is provided so as to be interposed between the vehicle body 1 and the wheel 2. The suspension apparatus 4 includes a suspension spring 5 (hereinafter referred to as a spring 5), and a damping force adjustable shock absorber (hereinafter referred to as a variable damper 6), which is provided so as to be arranged in a parallel relationship with the spring 5 and interposed between the vehicle body 1 and the wheel 2.

The variable damper 6 of the suspension apparatus 4 is an actuator provided between the vehicle body 1 and the wheel 2 of the vehicle and configured to change a force for suppressing a relative displacement between the vehicle body 1 and the wheel 2. Further, the variable damper 6 is also a force generation mechanism configured to adjust a force between the vehicle body 1 and the wheel 2 of the vehicle.

The variable damper 6 is constructed using a damping force adjustable hydraulic shock absorber. As illustrated in FIG. 2, the variable damper 6 is equipped with a damping force variable actuator 7 embodied by a damping force adjustment valve or the like for adjusting the characteristic of a generated damping force (i.e., a damping force characteristic) continuously from a hard characteristic (a high characteristic) to a soft characteristic (a low characteristic). The damping force variable actuator 7 is a damping force adjustment portion in which the damping force is adjusted according to a supplied current (a driving current).

The damping force variable actuator 7 does not necessarily have to be configured to continuously adjust the damping force characteristic, and may be configured to be able to adjust the damping force through a plurality of steps such as two or more steps. Further, the variable damper 6 may be a pressure control-type damper or may be a flow rate control-type damper.

A CAN 8 (controller area network) is a serial communication portion mounted on the vehicle body 1. The CAN 8 carries out in-vehicle multiplex communication between a large number of electronic devices mounted on the vehicle and an ECU 21. The CAN 8 transmits vehicle operation information using a CAN signal constituted by a serial signal. In this case, the vehicle operation information transmitted through the CAN 8 includes, for example, a yaw rate, a steering angle, a vehicle speed, a longitudinal acceleration, a brake hydraulic pressure, and an engine torque.

A sprung acceleration sensor 9 is provided on the vehicle body 1, and detects a vertical vibration acceleration on the vehicle body 1 side located on a sprung side. The sprung acceleration sensor 9 constitutes a sprung state detection unit that detects a sprung vibration. The sprung state detection unit is not limited to the detector that detects the sprung vibration, and may be, for example, a unit that estimates the sprung vibration based on the vehicle operation information contained in the CAN signal.

For example, three sprung acceleration sensors 9 in total are provided on the vehicle body 1. In this case, the sprung acceleration sensors 9 are, for example, mounted on the vehicle body 1 at positions located near the upper end sides of the left and right front wheel-side variable dampers 6, and also mounted on the vehicle body 1 at an intermediate position between the left and right rear wheels, respectively. The sprung acceleration sensors 9 each detect the vertical vibration acceleration on the vehicle body 1 side located on the sprung side, and outputs a detection signal thereof to the ECU 21.

An unsprung acceleration sensor 10 is provided on the wheel 2 side of the vehicle. Two unsprung acceleration sensors 10 in total are provided on the vehicle. More specifically, the unsprung acceleration sensors 10 are, for example, mounted on the right-side front wheel and the left-side front wheel of the vehicle, respectively. The unsprung acceleration sensors each 10 detect a vertical vibration acceleration on the wheel 2 side located on an unsprung side, and outputs a detection signal thereof to the ECU 21.

The ECU 21 constitutes a vehicle control apparatus that controls the suspension apparatus 4. The ECU 21 controls the variable damper 6 that changes the force for suppressing the relative displacement between the vehicle body 1 and the wheel 2. Now, the ECU 21 is a controller that controls the force to be generated by the variable damper 6 (the force generation mechanism). The ECU 21 performs control so as to weaken the force to be generated by the variable damper 6 (the force generation mechanism) when a change in a sprung posture and a sprung vibration in a sprung resonance frequency band transition from smaller states to larger states than respective predetermined values.

The ECU 21 includes a processor 22 serving as a control portion. The processor 22 is realized using, for example, a microcomputer. The ECU 21 includes a storage portion (not illustrated) realized using a ROM, a RAM, a nonvolatile memory, or the like. The processor 22 controls the damping force of the variable damper 6 by executing a program stored in the storage portion.

As illustrated in FIG. 2, the input side of the ECU 21 is connected to the CAN 8, the sprung acceleration sensor 9, the unsprung acceleration sensor 10, and the like, and the output side thereof is connected to the damping force variable actuator 7 of the variable damper 6, and the like. The processor 22 reads in the vehicle operation information from the CAN 8 via serial communication. The processor 22 reads in a sprung acceleration sensor value (a sprung acceleration) based on the detection signal from the sprung acceleration sensor 9. The processor 22 reads in an unsprung acceleration sensor value (an unsprung acceleration) based on the detection signal from the unsprung acceleration sensor 10.

Figure 3:
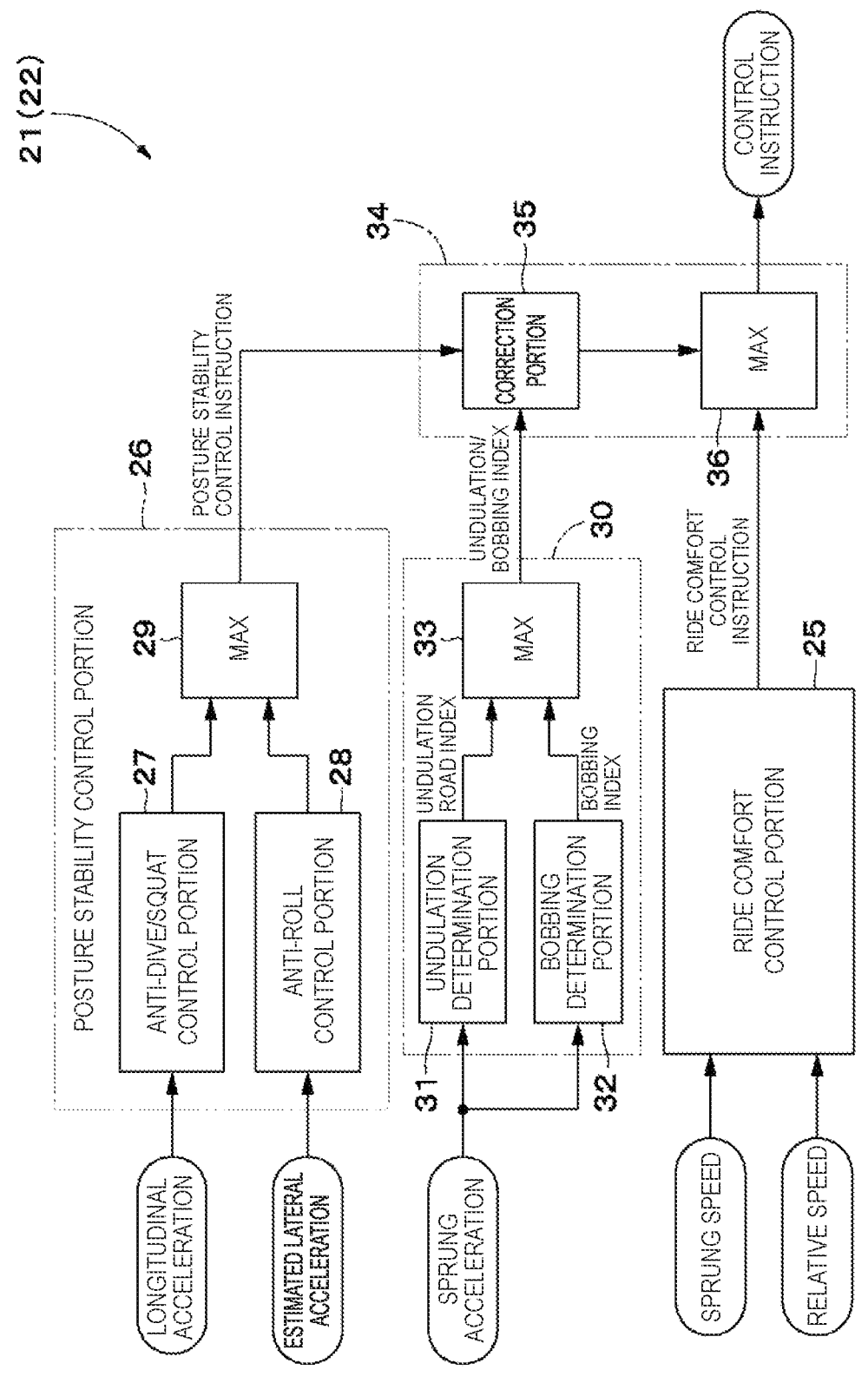
FIG. 3 is a block diagram illustrating the configuration of an ECU according to a first embodiment.
Figure 4:
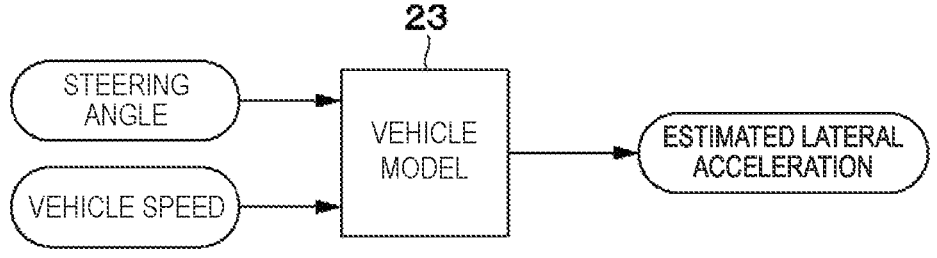
FIG. 4 is a block diagram illustrating the configuration of a vehicle model in the ECU.
Figure 5:
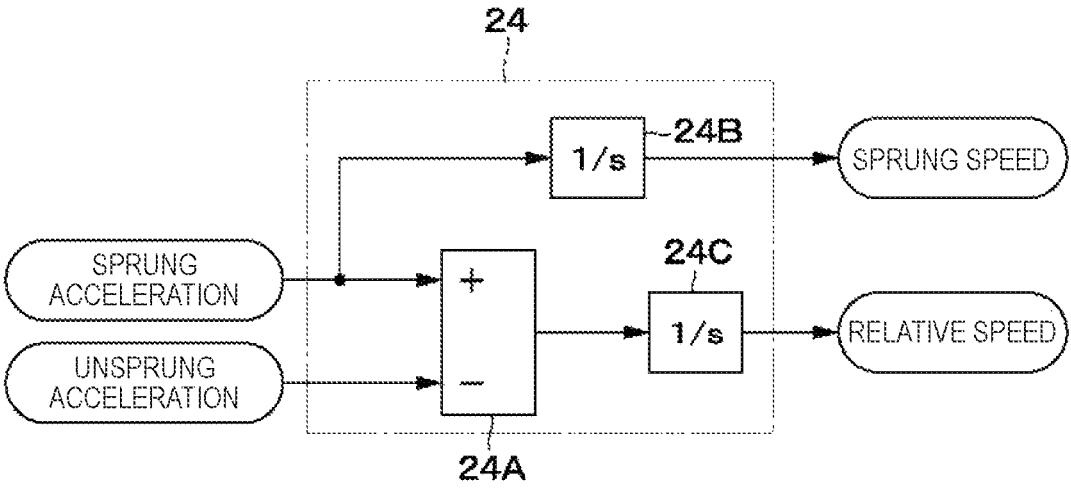
FIG. 5 is a block diagram illustrating the configuration of a vehicle behavior calculation portion in the ECU.

As illustrated in FIGS. 4 and 5, the ECU 21 includes a vehicle model 23 and a vehicle behavior calculation portion 24. The vehicle model 23 estimates a lateral acceleration of the vehicle. The vehicle behavior calculation portion 24 calculates a vehicle behavior such as a sprung speed and a relative speed. In addition thereto, the ECU 21 includes a ride comfort control portion 25, a posture stability control portion 26, an undulation/bobbing index calculation portion 30, and an instruction value calculation portion 34, which will be described below (refer to FIG. 3).

As illustrated in FIG. 4, the vehicle model 23 constitutes a vehicle posture detection unit that estimates the change in the sprung posture. The vehicle model 23 estimates the lateral acceleration of the vehicle based on information input from the CAN 8 (the vehicle operation information). More specifically, the vehicle model 23 estimates the lateral acceleration of the vehicle based on the steering angle and the vehicle speed, and outputs an estimated lateral acceleration. The vehicle posture detection unit is not limited to the vehicle model 23 that estimates the change in the sprung posture, and may be a detector that detects the change in the sprung posture (for example, the lateral acceleration or the like).

As illustrated in FIG. 5, the vehicle behavior calculation portion 24 calculates the vehicle behavior based on the sprung acceleration input from the sprung acceleration sensor 9 and the unsprung acceleration input from the unsprung acceleration sensor 10. The vehicle behavior calculation portion 24 includes a subtractor 24A and integrators 24B and 24C. The sprung acceleration and the unsprung acceleration are input to the vehicle behavior calculation portion 24. The subtractor 24A subtracts the unsprung acceleration from the sprung acceleration, thereby calculating a relative acceleration, which is a difference therebetween. The integrator 24B integrates the sprung acceleration, thereby calculating the sprung speed. The integrator 24C integrates the relative acceleration, thereby calculating the relative speed. The vehicle behavior calculation portion 24 outputs the sprung speed and the relative speed.

In the first embodiment, the vehicle behavior calculation portion 24 acquires the relative speed based on the sprung acceleration and the unsprung acceleration. For example, in a case where a stroke sensor is provided to the suspension apparatus 4 on each wheel, the relative speed may be acquired based on a value detected by the stroke sensor. Alternatively, the relative speed may be estimated based on the information input from the CAN 8 (the vehicle operation information).

As illustrated in FIG. 3, the ride comfort control portion 25 outputs a ride comfort control instruction for improving the ride comfort of the vehicle. The ride comfort control portion 25 controls the variable damper 6 according to the input sprung vibration of the vehicle. For example, the sprung speed and the relative speed are contained in the sprung vibration of the vehicle. The sprung vibration of the vehicle may be detected directly by a sensor or the like, or may be estimated based on, for example, the sprung acceleration. The ride comfort control portion 25 acquires the sprung speed and the relative speed between the sprung side and the unsprung side (a piston speed) from the vehicle behavior calculation portion 24. The ride comfort control portion 25 outputs the ride comfort control instruction based on the sprung speed and the relative speed of each wheel. At this time, for example, a control instruction value (a current value), which serves as an instruction signal for a current to the damping force variable actuator 7, is output as the ride comfort control instruction. The ride comfort control portion 25 outputs the control instruction value for reducing the sprung vertical vibration using the sprung speed and the relative speed based on, for example, the skyhook control law.

The ride comfort control portion 25 is assumed to output the ride comfort control instruction value based on the skyhook control in the first embodiment. The present invention is not limited thereto, and the ride comfort control portion may output the ride comfort control instruction based on, for example, the bilinear optimal control or the H∞ control.

The posture stability control portion 26 outputs a posture stability control instruction for improving the posture stability of the vehicle. The longitudinal acceleration transmitted from the CAN 8 and the estimated lateral acceleration output from the vehicle model 23 are input to the posture stability control portion 26. The posture stability control portion 26 outputs the posture stability control instruction based on the longitudinal acceleration and the estimated lateral acceleration. The posture stability control portion 26 controls the variable damper 6 according to an input change in the posture of the vehicle. The posture stability control portion 26 outputs the posture stability control instruction so as to set the variable damper 6 to the hard characteristic when the change in the posture of the vehicle matches or exceeds a predetermined value. The change in the posture of the vehicle occurs due to, for example, turning, acceleration, or deceleration of the vehicle. The longitudinal acceleration and the estimated lateral acceleration are input to the posture stability control portion 26. As illustrated in FIG. 3, the posture stability control portion 26 includes an anti-dive/squat control portion 27, an anti-roll control portion 28, and a control instruction selection portion 29.

Figure 6:
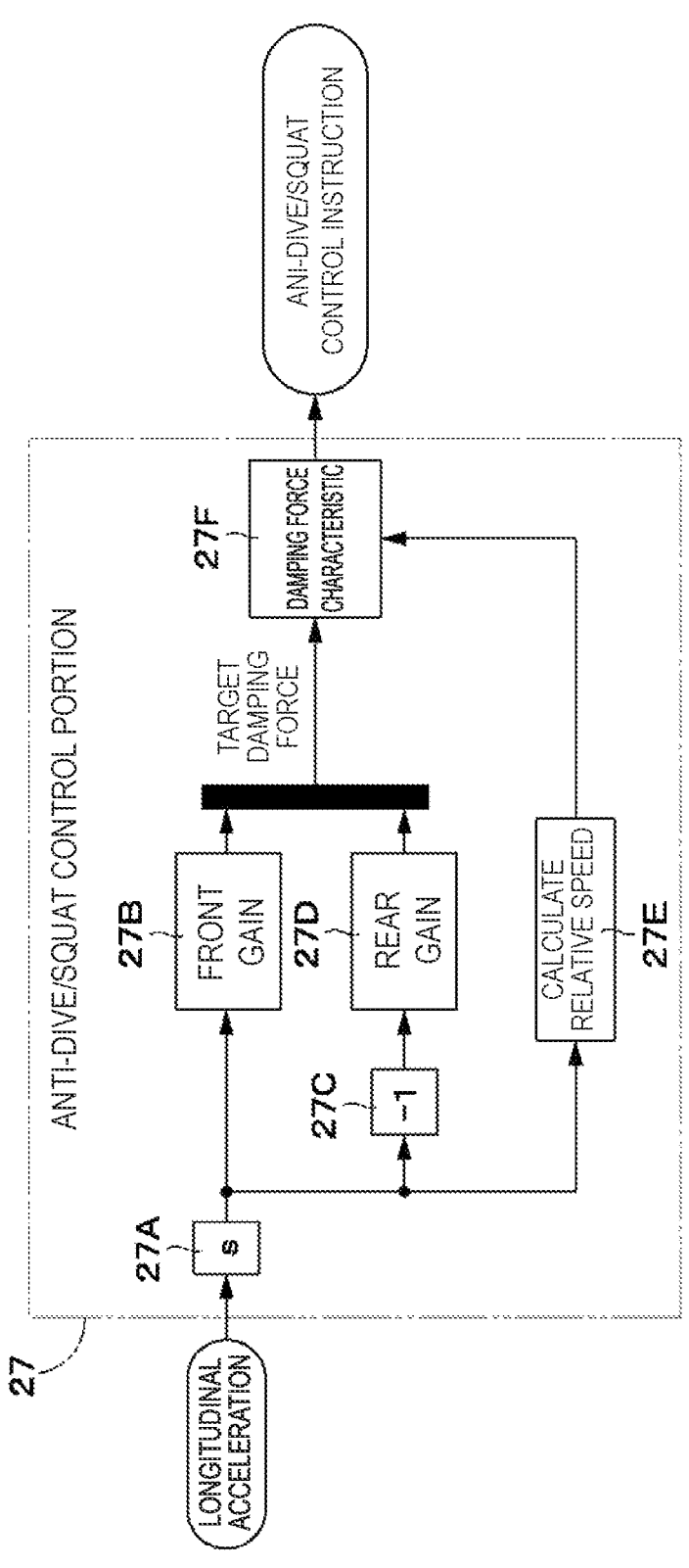
FIG. 6 is a block diagram illustrating the configuration of an anti-dive/squat control portion illustrated in FIG. 3.

The anti-dive/squat control portion 27 outputs an anti-dive/squat control instruction for suppressing a longitudinal tilt of the vehicle due to acceleration or deceleration of the vehicle. The longitudinal acceleration is input to the anti-dive/squat portion 27. As illustrated in FIG. 6, the anti-dive/squat control portion 27 includes a differentiator 27A, a front gain multiplication portion 27B, an inversion portion 27C, a rear gain multiplication portion 27D, a relative speed calculation portion 27E, and a damping force characteristic processing portion 27F.

The differentiator 27A calculates a jerk in the longitudinal direction of the vehicle (a longitudinal jerk) by differentiating the longitudinal acceleration. The front gain multiplication portion 27B multiplies the longitudinal jerk by a front gain, and outputs a front-side target damping force. The rear gain multiplication portion 27D multiplies the longitudinal jerk by a rear gain after the longitudinal jerk is multiplied by "−1" by the inversion portion 27C, and outputs a rear-side target damping force.

For example, when the differential value of the longitudinal acceleration (the longitudinal jerk) has a negative value, a dive behavior is expected, and therefore a target damping force preparing for compression of the damper should be derived for the front side and a target damping force preparing for extension of the damper should be derived for the rear side. In light thereof, the inversion portion 27C multiplies the longitudinal jerk by "−1" before the longitudinal jerk is multiplied by the rear gain. In other words, the extension side of the damper is assumed to be a positive side and the compression side of the damper is assumed to be a negative side in this example.

The relative speed calculation portion 27E calculates a relative speed based on the longitudinal jerk. The damping force characteristic processing portion 27F includes, for example, a damping force map that indicates the relationship between the target damping force and the relative speed, and the instruction value (the control instruction) to be output to the variable damper 6. The damping force characteristic processing portion 27F outputs a control instruction for controlling the variable damper 6 on the front side based on the target damping force and the relative speed on the front side. The damping force characteristic processing portion 27F outputs a control instruction for controlling the variable damper 6 on the rear side based on the target damping force and the relative speed on the rear side. These control instructions are the anti-dive/squat control instruction, and, for example, correspond to a control instruction value serving as an instruction signal for a current to the damping force variable actuator 7 (a current value).

Figure 7:
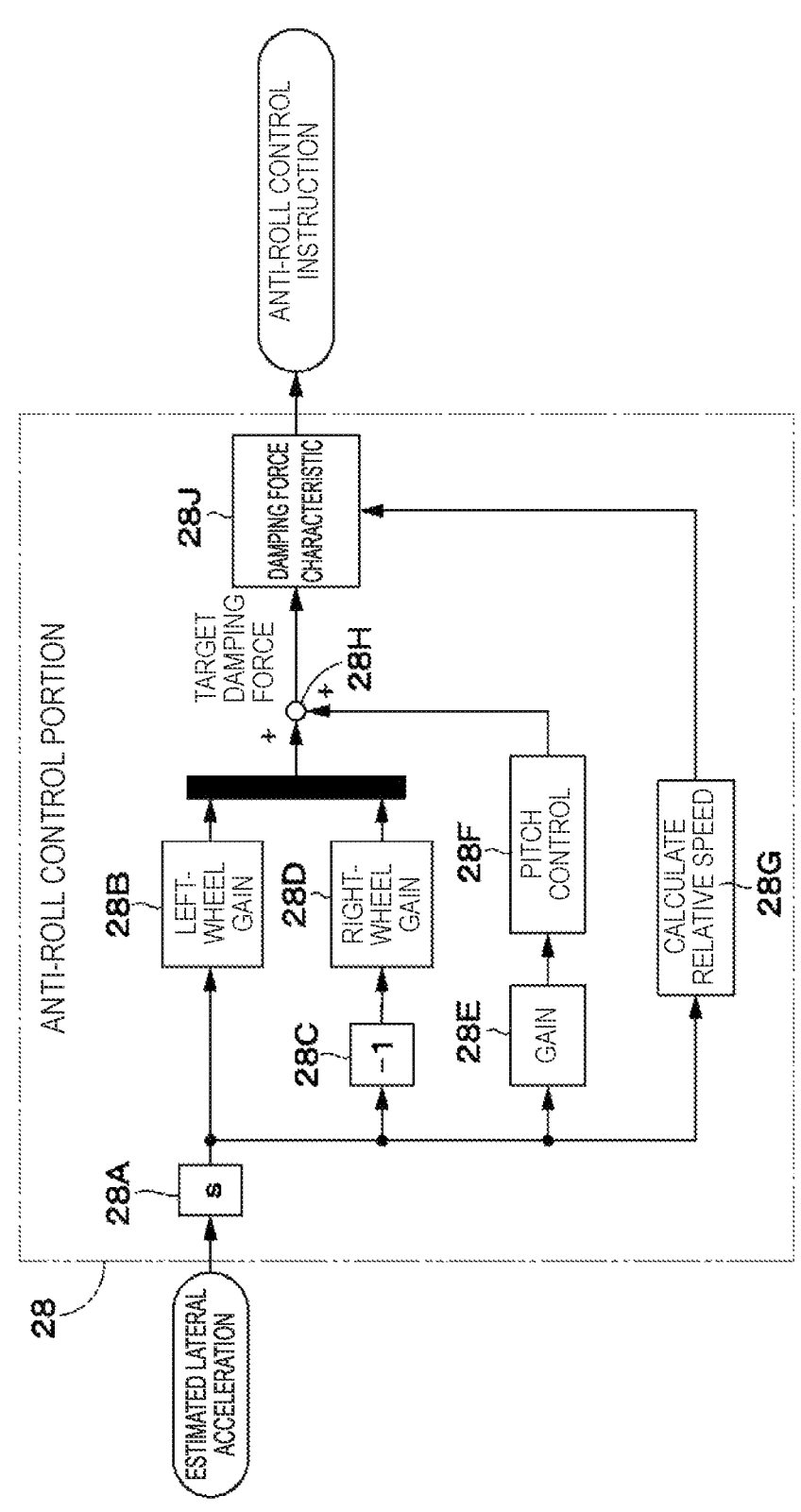
FIG. 7 is a block diagram illustrating the configuration of an anti-roll control portion illustrated in FIG. 3.

The anti-roll control portion 28 outputs an anti-roll control instruction for suppressing a roll behavior of the vehicle. The estimated lateral acceleration is input to the anti-roll control portion 28. As illustrated in FIG. 7, the anti-roll control portion 28 includes a differentiator 28A, a left-wheel gain multiplication portion 28B, an inversion portion 28C, a right-wheel gain multiplication portion 28D, a gain multiplication portion 28E, a pitch control processing portion 28F, a relative speed calculation portion 28G, an adder 28H, and a damping force characteristic processing portion 28J.

The differentiator 28A calculates a jerk in the lateral direction (the left-right direction) of the vehicle (a lateral jerk) by differentiating the estimated lateral acceleration. The left-wheel gain multiplication portion 28B multiplies the lateral jerk by a left-wheel gain and outputs a target damping force on the left wheel side. The right-wheel gain multiplication portion 28D multiplies the lateral jerk by a right-wheel gain after the lateral jerk is multiplied by "−1" by the inversion portion 28C, and outputs a target damping force on the right wheel side.

For example, when the differential value of the estimated lateral acceleration (the lateral jerk) has a positive value, the vehicle body is expected to sink on the right wheel side, and therefore the left wheel side should prepare for the extension side of the damper and the right wheel side should prepare for the compression side of the damper. In light thereof, the inversion portion 28C multiplies the lateral jerk by "−1" before the lateral jerk is multiplied by the right-wheel gain.

The anti-roll control portion 28 extends "control of a longitudinal motion according to a lateral motion", which is a basic concept of G vectoring for improving drivability, and controls a pitch motion according to the lateral motion. For this purpose, the gain multiplication portion 28E multiplies the lateral jerk by a gain. The pitch control processing portion 28F derives a target damping force for pitch control that meets the extended concept of G vectoring based on the lateral jerk multiplied by the gain.

The relative speed calculation portion 28G calculates a relative speed based on the lateral jerk. The adder 28H adds the left wheel-side target damping force for pitch control to the left wheel-side target damping force for roll suppression, and outputs the left wheel-side target damping force for controlling a roll and a pitch. The adder 28H adds the right wheel-side target damping force for pitch control to the right wheel-side target damping force for roll suppression, and outputs the right wheel-side target damping force for controlling a roll and a pitch.

The damping force characteristic processing portion 28J includes, for example, a damping force map that indicates the relationship between the target damping force and the relative speed, and the instruction value (the control instruction) to be output to the variable damper 6. The damping force characteristic processing portion 28J outputs a control instruction for controlling the variable damper 6 on the left-wheel side based on the target damping force and the relative speed on the left-wheel side. The damping force characteristic processing portion 28J outputs a control instruction for controlling the variable damper 6 on the right-wheel side based on the target damping force and the relative speed on the right-wheel side. These control instructions are the anti-roll control instruction, and, for example, correspond to a control instruction value serving as an instruction signal for a current to the damping force variable actuator 7 (a current value).

As illustrated in FIG. 3, the anti-dive/squat control instruction and the anti-roll control instruction are input to the control instruction selection portion 29. The control instruction selection portion 29 compares the anti-dive/squat control instruction and the anti-roll control instruction, and selects a control instruction having a larger value. The control instruction selection portion 29 outputs the selected control instruction as the posture stability control instruction.

The undulation/bobbing index calculation portion 30 determines whether a vibration occurs based on a vertically undulating road surface (hereinafter referred to as an undulation road) or a road surface inducing a bobbing vibration (hereinafter referred to as a bobbing road surface) based on the sprung acceleration. The undulation/bobbing index calculation portion 30 includes an undulation determination portion 31, a bobbing determination portion 32, and a maximum value selection portion 33.

Figure 8:
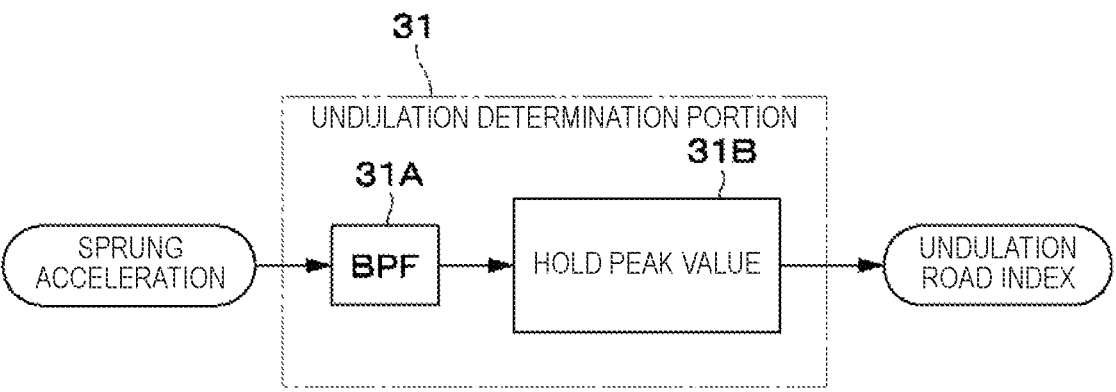
FIG. 8 is a block diagram illustrating the configuration of an undulation determination portion illustrated in FIG. 3.

As illustrated in FIG. 8, the undulation determination portion 31 includes a bandpass filter 31A (hereinafter referred to as a BPF 31A) and a peak value holding portion 31B. The BPF 31A extracts a vibration component induced by the undulation road in the sprung acceleration. More specifically, the BPF 31A extracts a vibration component in a frequency band (for example, 0.5 to 1.5 Hz) containing approximately 1 Hz, which is characteristic as undulation, among, for example, frequency components equal to or lower than 3 Hz included in the sprung acceleration. When the vibration component accompanying the undulation is extracted from the BPF 31A, the peak value holding portion 31B holds a maximum value thereof and outputs it as an undulation road index.

Figure 9:
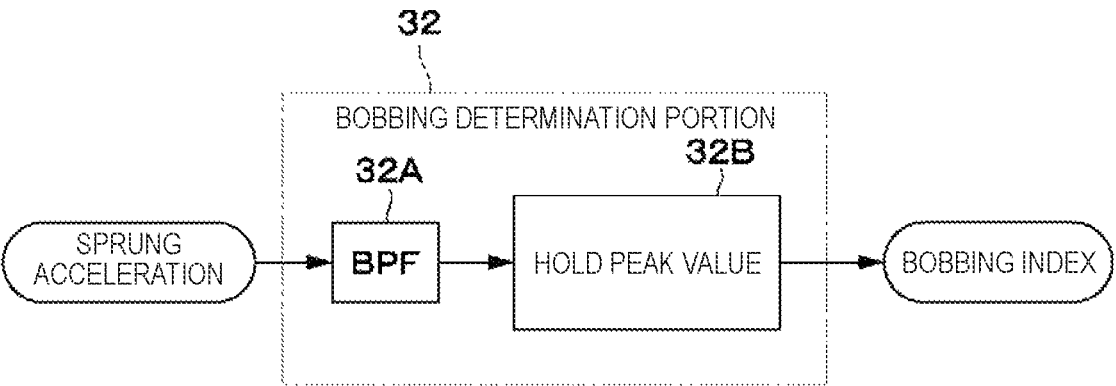
FIG. 9 is a block diagram illustrating the configuration of a bobbing determination portion illustrated in FIG. 3.

As illustrated in FIG. 9, the bobbing determination portion 32 includes a bandpass filter 32A (hereinafter referred to as a BPF 32A) and a peak value holding portion 32B. The BPF 32A extracts a vibration component induced by the bobbing road surface (a bobbing vibration) in the sprung acceleration. More specifically, the BPF 32A extracts a vibration component in a frequency band of the bobbing vibration (for example, 3 to 7 Hz) included in the sprung acceleration. When the vibration component accompanying the bobbing vibration is extracted from the BPF 32A, the peak value holding portion 32B holds a maximum value thereof and outputs it as a bobbing index.

As illustrated in FIG. 3, the maximum value selection portion 33 compares the undulation road index output from the undulation determination portion 31 and the bobbing index output from the bobbing determination portion 32, and selects an index having a larger value and outputs it as the undulation/bobbing index.

The instruction value calculation portion 34 determines an instruction value directed to the variable damper 6 (the actuator) based on both the instruction values of the posture stability control portion 26 and the ride comfort control portion 25. When the change in the posture of the vehicle is equal to or larger than a predetermined value and the sprung vibration in the sprung resonance frequency band is larger than a predetermined value, the instruction value calculation portion 34 prioritizes the instruction value of the ride comfort control portion 25. The instruction value calculation portion 34 includes a correction portion 35 and a control instruction selection portion 36.

Figure 10:
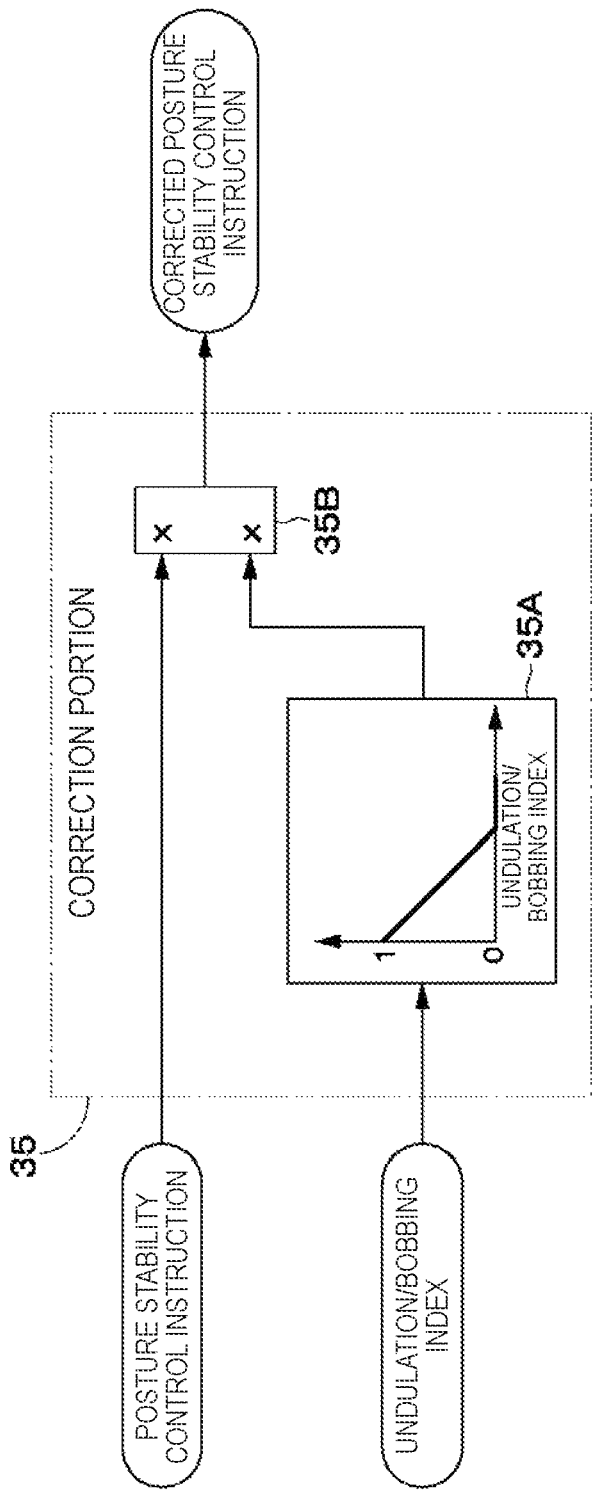
FIG. 10 is a block diagram illustrating the configuration of a correction portion illustrated in FIG. 3.

The correction portion 35 weakens the instruction value of the posture stability control portion 26 (the posture stability control instruction) so as to prioritize the instruction value of the ride comfort control portion 25 (the ride comfort control instruction). As illustrated in FIG. 10, the correction portion 35 includes a conversion table 35A and a multiplier 35B.

The conversion table 35A acquires an output value by converting the undulation/bobbing index into a value from 0 to 1. A large output value is acquired when the undulation/bobbing index is small, and a small output value is acquired when the undulation/bobbing index is large. In other words, the output value reduces from 1 to 0 as the undulation/bobbing index increases. The output value indicates an index for correcting the posture stability control instruction. The multiplier 35B multiplies the posture stability control instruction by this output value and outputs a corrected posture stability control instruction.

The control instruction selection portion 36 compares the ride comfort control instruction and the corrected posture stability control instruction, and selects a control instruction having a larger value. The control instruction selection portion 36 outputs the selected control instruction as a final control instruction. More specifically, the control instruction selection portion 36 selects a hard-side value from the ride comfort control instruction and the corrected posture stability control instruction. At this time, the instruction value calculation portion 34 performs the same processing with respect to the respective control instructions for the four wheels. A driving current based on the final control instruction is supplied to the damping force variable actuator 7 of the variable damper 6. As a result, the damping force of the variable damper 6 is controlled by the ECU 21.

The ECU 21 according to the first embodiment is configured in the above-described manner, and an operation thereof will be described next.

When a vertical vibration occurs due to, for example, roughness of the road surface while the vehicle runs, various kinds of vehicle operation information, the sprung acceleration, the unsprung acceleration, and the like are input from the CAN 8, the sprung acceleration sensor 9, and the unsprung acceleration sensor 10 to the ECU 21. At this time, the vehicle model 23 of the ECU 21 calculates the estimated lateral acceleration based on the steering angle and the vehicle speed. Further, the vehicle behavior calculation portion 24 calculates the sprung speed and the relative speed based on the sprung acceleration and the unsprung acceleration.

The ride comfort control portion 25 of the ECU 21 outputs the ride comfort control instruction for improving ride comfort of the vehicle based on the sprung speed and the relative speed. The posture stability control portion 26 of the ECU 21 outputs the posture stability control instruction for improving the posture stability of the vehicle based on the estimated lateral acceleration and the longitudinal acceleration. At this time, a value for suppressing a dive/squat and a roll is output as the posture stability control instruction.

Then, for example, if the vehicle is suddenly braked while running on a road surface accompanied by vertical undulation (the undulation road) or a road surface inducing a bobbing vibration (3 to 7 Hz) (the bobbing road surface), the change rate of the longitudinal acceleration, i.e., the differential value of the longitudinal acceleration increases at the anti-dive/squat control portion 27. As a result, the anti-dive/squat control instruction may undesirably remain large at a maximum instruction value outputtable by the system, leading to deterioration of the vibration damping performance against the road surface undulation or the bobbing vibration. Alternatively, if the vehicle changes a lane while running on the undulation road or the bobbing road surface, the change rate of the estimated lateral acceleration, i.e., the differential value of the estimated lateral acceleration increases at the anti-roll control portion 28. As a result, the anti-roll control instruction may undesirably remain large at a maximum instruction value outputtable by the system, leading to deterioration of the vibration damping performance against the road surface undulation or the bobbing vibration.

In light thereof, the ECU 21 according to the present embodiment calculates the undulation road index, which indicates how much the road surface undulates, based on the sprung acceleration by the undulation determination portion 31, and calculates the bobbing index, which indicates a bobbing vibration level, based on the sprung acceleration by the bobbing determination portion 32. After that, the maximum value selection portion 33 outputs a larger value of the undulation road index and the bobbing index as the undulation/bobbing index. The correction portion 35 of the ECU 21 corrects the posture stability control instruction based on the undulation/bobbing index.

This will be more specifically described. The undulation/bobbing index calculation portion 30 of the ECU 21 calculates the undulation road index and the bobbing index based on the sprung acceleration. The undulation/bobbing index calculation portion 30 selects a larger value of the undulation road index and the bobbing index. The undulation/bobbing index calculation portion 30 outputs the selected index as the undulation/bobbing index.

The instruction value calculation portion 34 calculates the instruction value directed to the variable damper 6 (the actuator) based on the posture stability control instruction and the ride comfort control instruction. The instruction value calculation portion 34 includes the correction portion 35, which weakens the posture stability control instruction so as to prioritize the ride comfort control instruction. The correction portion 35 multiplies the posture stability control instruction by the output value from the conversion table 35A, which receives the undulation/bobbing index as an input, and outputs the corrected posture stability control instruction. The conversion table 35A, which receives the undulation/bobbing index as an input, outputs a smaller value as the undulation/bobbing index increases. As a result, even when the posture stability control instruction remains large because the vehicle is suddenly braked or changes a lane while running on a road surface accompanied by vertical undulation, a small value can be acquired as the corrected posture stability control instruction.

The instruction value calculation portion 34 selects a control instruction having a larger value from the corrected posture stability control instruction and the ride comfort control instruction, and outputs the selected control instruction as the final control instruction. Due to that, the instruction value calculation portion 34 prioritizes the ride comfort control instruction over the posture stability control instruction when the change in the posture of the vehicle is equal to or larger than the predetermined value and the sprung vibration in the sprung resonance frequency band is larger than the predetermined value. As a result, even when the posture stability control instruction remains large because the vehicle is suddenly braked or changes a lane while running on a road surface accompanied by vertical undulation, the vibration damping performance against the undulation of the road surface can be maintained.

Next, the vibration damping performance and the like are compared by conducting a vehicle simulation between feedback control based on the conventional skyhook control law as control according to a comparison example and the control according to the first embodiment to confirm the vibration damping effect achieved by the ECU 21. The simulation is conducted supposing that the vehicle changes a lane twice while running at 60 km/h on a triangle wave-shaped road surface accompanied by vertical continuous undulation with a wavelength of 12 m and a peak-to-peak value of 80 mm, as simulation conditions.

Figure 11:
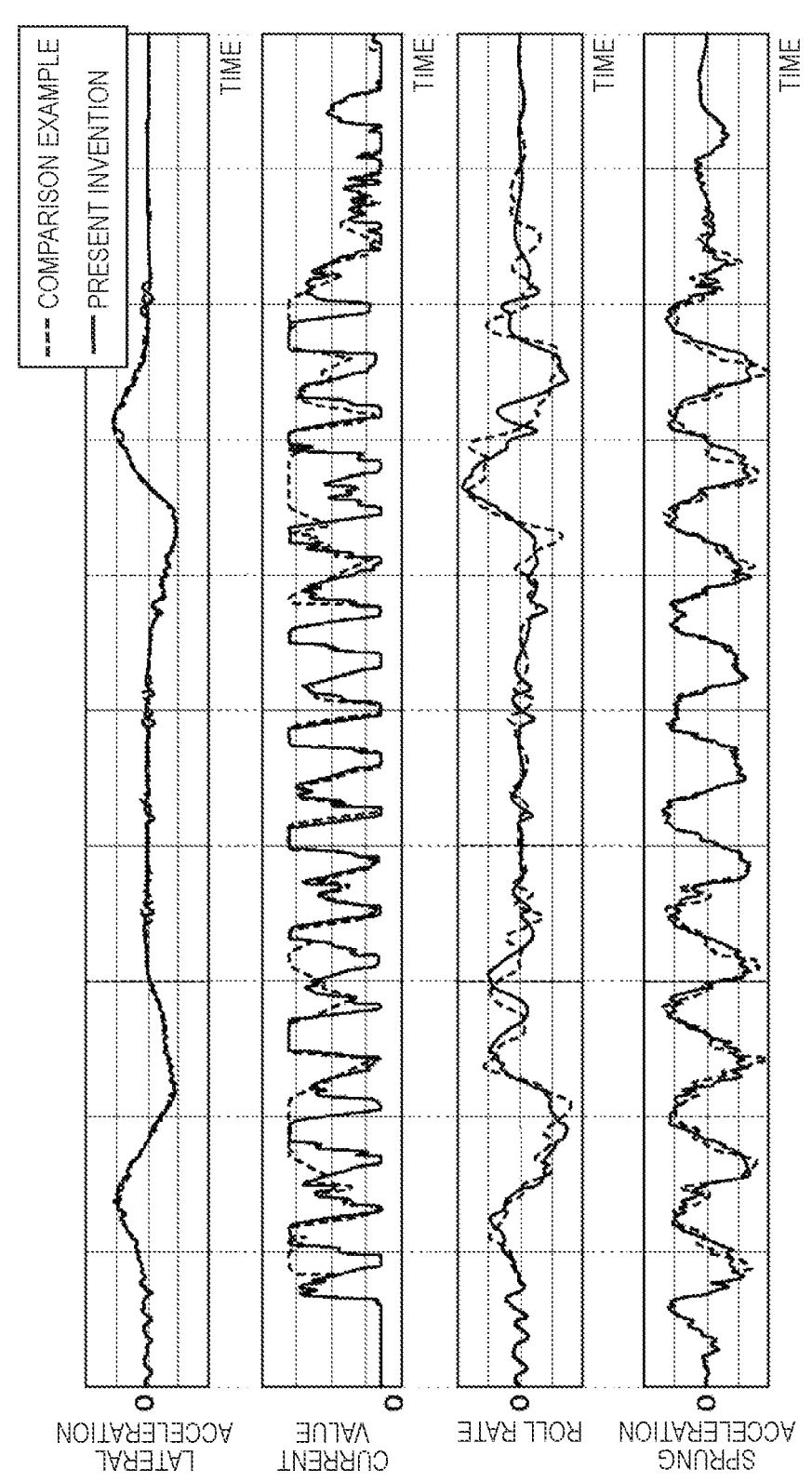
FIG. 11 illustrates characteristic lines representing changes in a lateral acceleration, a current value, a roll rate, and a sprung acceleration over time with respect to the first embodiment and a comparison example.
Figure 12:
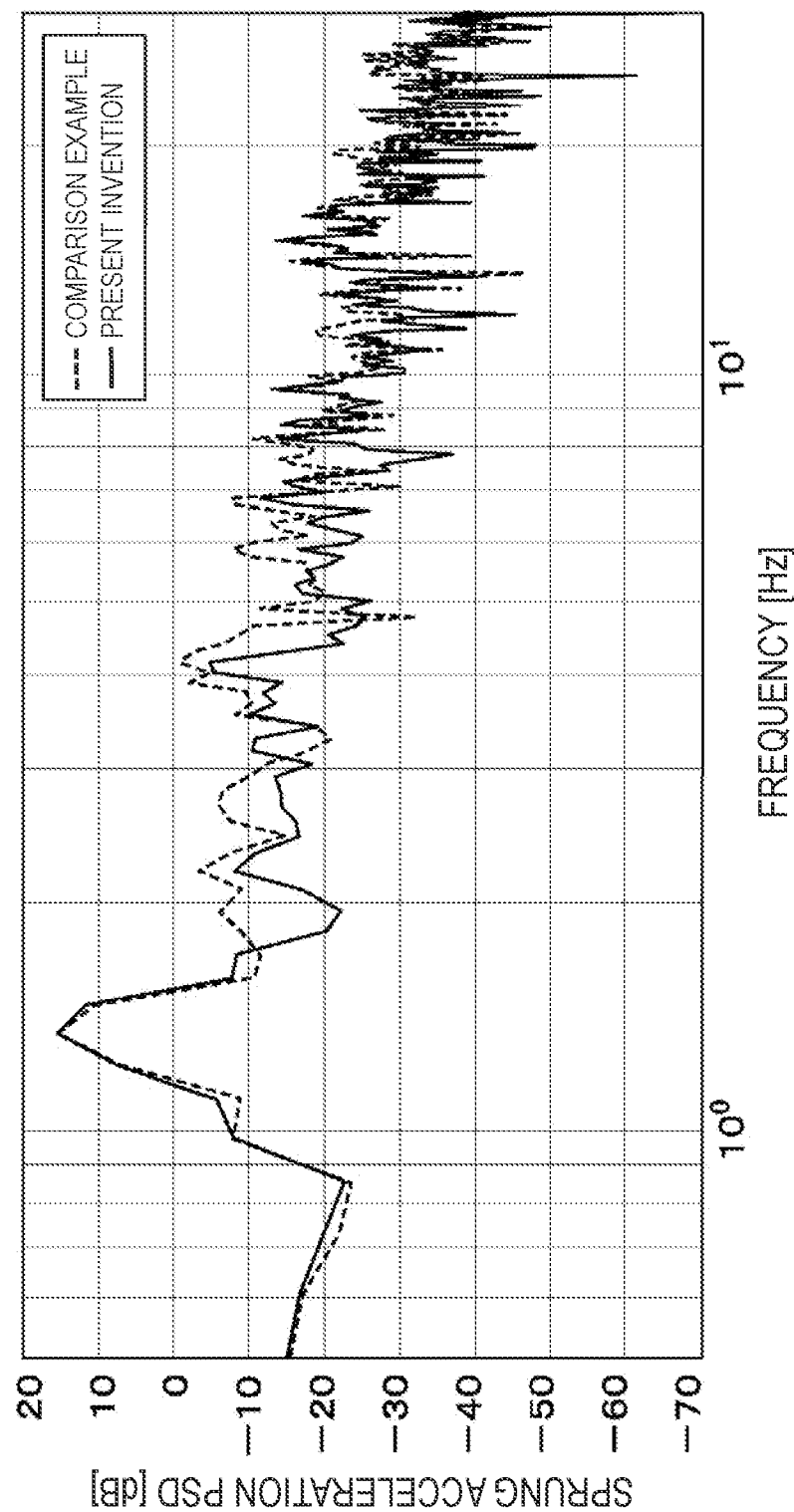
FIG. 12 illustrates characteristic lines representing frequency characteristics of a sprung acceleration PSD with respect to the first embodiment and the comparison example.

FIGS. 11 and 12 indicate a result of the simulation. As illustrated in FIG. 11, the first embodiment allows the current value (the control instruction value) to less remain large while keeping the roll rate indicating the posture stability equivalent to the comparison example. According thereto, the first embodiment can suppress the bobbing vibration (3 to 7 Hz) compared to the comparison example as illustrated in FIG. 12.

In this manner, according to the first embodiment, the ECU 21 (the vehicle control apparatus) includes the posture stability control portion 26, which controls the variable damper 6 (the actuator) according to the input change in the posture of the vehicle, the ride comfort control portion 25, which controls the variable damper 6 according to the input sprung vibration of the vehicle, and the instruction value calculation portion 34, which calculates the instruction value directed to the variable damper 6 based on both the instruction values of the posture stability control portion 26 and the ride comfort control portion 25.

Now, the processor 22 of the ECU 21 performs control so as to weaken the force to be generated by the variable damper 6 when the change in the sprung posture and the sprung vibration in the sprung resonance frequency band transition from the smaller states to the larger states than the respective predetermined values. More specifically, when the change in the posture of the vehicle is equal to or larger than a predetermined value and the sprung vibration in the sprung resonance frequency band is larger than the predetermined value, the instruction value calculation portion 34 prioritizes the instruction value of the ride comfort control portion 25. As a result, even when the vehicle is, for example, turned, braked, or driven on the undulation road surface, the ride comfort control instruction can be prioritized and the vibration damping performance can be improved.

Further, the instruction value calculation portion 34 includes the correction portion 35, which weakens the instruction value of the posture stability control portion 26 so as to prioritize the instruction value of the ride comfort control portion 25. Due to that, when the change in the posture of the vehicle is equal to or larger than the predetermined value and the sprung vibration in the sprung resonance frequency band is larger than the predetermined value, the posture stability control instruction can be set to a small value (a soft-side instruction) and the ride comfort control instruction can be prioritized.

Figure 13:
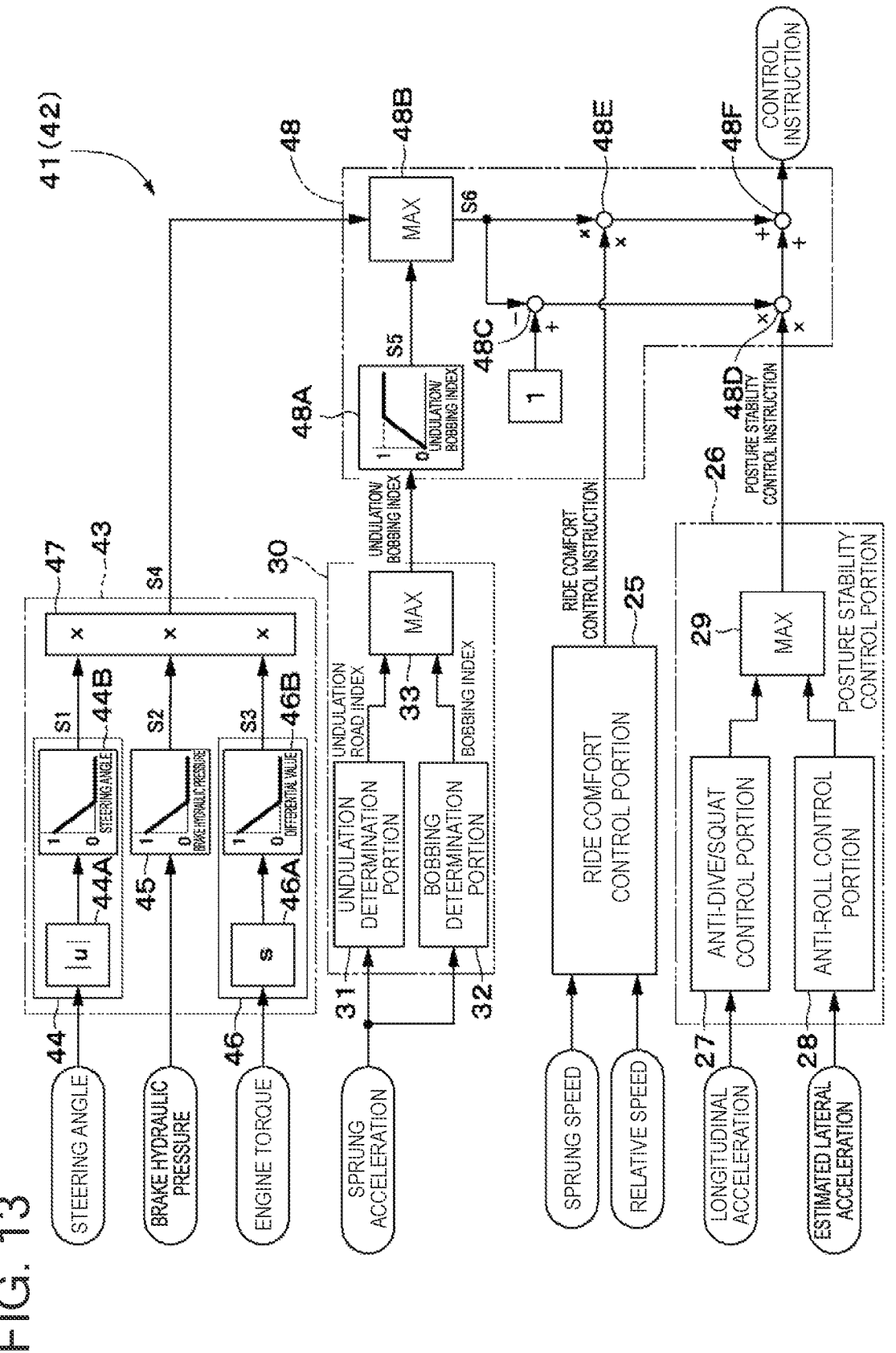
FIG. 13 is a block diagram illustrating the configuration of an ECU according to a second embodiment.

Next, FIGS. 1, 2, and 13 illustrate a second embodiment of the present invention. The second embodiment is characterized by being configured to switch the ride comfort control and the posture stability control according to a turning or acceleration/deceleration level in addition to the undulation/bobbing index. The second embodiment will be described, indicating similar components to the above-described first embodiment by the same reference numerals and omitting descriptions thereof.

An ECU 41 according to the second embodiment is configured approximately similarly to the ECU 21 according to the first embodiment. The ECU 41 constitutes the vehicle control apparatus that controls the suspension apparatus 4. The ECU 41 is a controller that controls the force to be generated by the variable damper 6 (the force generation mechanism). As illustrated in FIG. 2, the ECU 41 includes a processor 42 serving as a control portion. The processor 42 is realized using, for example, a microcomputer. The processor 42 controls the damping force of the variable damper 6 by executing a program stored in a storage portion (not illustrated). The input side of the ECU 41 is connected to the CAN 8, the sprung acceleration sensor 9, the unsprung acceleration sensor 10, and the like, and the output side thereof is connected to the variable damper 6 and the like.

The ECU 41 includes the vehicle model 23 and the vehicle behavior calculation portion 24 similarly to the ECU 21 according to the first embodiment. In addition thereto, the ECU 41 includes the ride comfort control portion 25, the posture stability control portion 26, the undulation/bobbing index calculation portion 30, a turning/acceleration/deceleration index calculation portion 43, and an instruction value calculation portion 48 (refer to FIG. 13).

As illustrated in FIG. 13, the turning/acceleration/deceleration calculation portion 43 includes a turning index calculation portion 44, a deceleration index calculation portion 45, an acceleration index calculation portion 46, and a multiplier 47. The turning/acceleration/deceleration index calculation portion 43 calculates a turning/acceleration/deceleration index S4.

The turning index calculation portion 44 calculates a turning index S1 according to a turning level based on the steering angle. The steering angle is input to the turning index calculation portion 44 via the CAN 8. The turning index calculation portion 44 includes an absolute value calculation portion 44A and a conversion table 44B. The absolute value calculation portion 44A acquires an absolute value of the steering angle. The conversion table 44B calculates the turning index S1 by converting the magnitude (the absolute value) of the steering angle into a value from 0 to 1. A large value (a value close to 1) is acquired as the turning index S1 when the steering angle has a small absolute value, and a small value (a value close to 0) is acquired as the turning index S1 when the steering angle has a large absolute value. In other words, the turning index S1 reduces from 1 to 0 as the absolute value of the steering angle increases.

The deceleration index calculation portion 45 calculates a deceleration index S2 according to the deceleration of the vehicle based on a brake hydraulic pressure. The brake hydraulic pressure is input to the deceleration index calculation portion 45 via the CAN 8. The deceleration index calculation portion 45 includes a conversion table. The conversion table of the deceleration index calculation portion 45 calculates the deceleration index S2 by converting the brake hydraulic pressure into a value from 0 to 1. A large value (a value close to 1) is acquired as the deceleration index S2 when the brake hydraulic pressure is small (low), and a small value (a value close to 0) is acquired as the deceleration index S2 when the brake hydraulic pressure is larger (high). In other words, the deceleration index S2 reduces from 1 to 0 as the brake hydraulic pressure increases.

The acceleration index calculation portion 46 calculates an acceleration index S3 according to the acceleration of the vehicle based on an engine torque. The engine torque is input to the acceleration index calculation portion 46 via the CAN 8. The acceleration index calculation portion 46 includes a differentiator 46A and a conversion table 46B. The differentiator 46A calculates a differential value of the engine torque by differentiating the engine torque. The conversion table 46B calculates the acceleration index S3 by converting the differential value of the engine torque into a value from 0 to 1. A large value (a value close to 1) is acquired as the acceleration index S3 when the differential value of the engine torque is small, and a small value (a value close to 0) is acquired as the acceleration index S3 when the differential value of the engine torque is large. In other words, the acceleration index S3 reduces from 1 to 0 as the differential value of the engine torque increases.

The multiplier 47 calculates a product of the turning index S1, the deceleration index S2, and the acceleration index S3, and outputs the turning/acceleration/deceleration index S4. Therefore, the turning/acceleration/deceleration index S4 has a large value (a value close to 1) when all of the turning index S1, the deceleration index S2, and the acceleration index S3 have values close to 1. On the other hand, the turning/acceleration/deceleration index S4 has a value of 0 when any of the turning index S1, the deceleration index S2, and the acceleration index S3 has a value of 0.

The instruction value calculation portion 48 determines the instruction value directed to the variable damper 6 (the actuator) based on both the instruction values of the posture stability control portion 26 and the ride comfort control portion 25. When the change in the posture of the vehicle is equal to or larger than the predetermined value and the sprung vibration in the sprung resonance frequency band is larger than the predetermined value, the instruction value calculation portion 48 prioritizes the instruction value of the ride comfort control portion 25. The instruction value calculation portion 48 constitutes the correction portion. The instruction value calculation portion 48 weakens the instruction value of the posture stability control portion 26 (the posture stability control instruction) so as to prioritize the instruction value of the ride comfort control portion 25 (the ride comfort control instruction).

The instruction value calculation portion 48 includes a conversion table 48A, a maximum value selection portion 48B, a subtractor 48C, multipliers 48D and 48E, and an adder 48F. The conversion table 48A calculates a converted undulation/bobbing index S5 by converting the undulation/bobbing index into a value from 0 to 1. A small value is acquired as the converted undulation/bobbing index S5 when the undulation/bobbing index is small, and a large value is acquired as the converted undulation/bobbing index S5 when the undulation/bobbing index is large. In other words, the converted undulation/bobbing index S5 increases from 0 to 1 as the undulation/bobbing index increases. The maximum value selection portion 48B compares the turning/acceleration/deceleration index S4 and the converted undulation/bobbing index S5 and selects an index having a larger value, and outputs the result thereof as a selected index S6.

The subtractor 48C subtracts the selected index S6 from 1. The multiplier 48D multiplies the posture stability control instruction by the output value from the subtractor 48C and outputs the corrected posture stability control instruction. Therefore, the corrected posture stability control instruction has a large value when the selected index S6 has a value close to 0. On the other hand, the corrected posture stability control instruction has a small value when the selected index S6 has a value close to 1.

The multiplier 48E multiplies the ride comfort control instruction by the selected index S6 and outputs a corrected ride comfort control instruction. Therefore, the corrected ride comfort control instruction has a small value when the selected index S6 has a value close to 0. On the other hand, the corrected ride comfort control instruction has a large value when the selected index S6 has a value close to 1. The adder 48F adds the corrected posture stability control instruction and the corrected ride comfort control instruction, and outputs the result thereof as the final control instruction.

In this manner, the thus-configured second embodiment can also bring about advantageous effects similar to the first embodiment. Further, in the second embodiment, the ride comfort control and the posture stability control are switched according to the turning or acceleration/deceleration level and the undulation/bobbing index. For example, even with a small undulation/bobbing index input, when the "turning level is low, i.e., the absolute value of the steering angle is small and thus the turning index S1 is close to 1" or the "acceleration/deceleration level is low, i.e., the brake hydraulic pressure is low and the differential of the engine torque is small and thus both the deceleration index S2 and the acceleration index S3 are close to 1", the posture stability does not have to remain a primary concern and therefore it may be desirable to prioritize the ride comfort control.

In this case, the turning/acceleration/deceleration index S4 has a value close to 1 because being a product of the turning index S1, the deceleration index S2, and the acceleration index S3. The selected index S6 is set to an index having a larger value selected from the turning/acceleration/deceleration index S4 and the converted undulation/bobbing index S5, and therefore has a value close to 1. At this time, the output of the ride comfort control portion 25 (the ride comfort control instruction) is multiplied by a coefficient that is the selected index S6 and is a value close to 1. On the other hand, the output of the posture stability control portion 26 (the posture stability control instruction) is multiplied by a coefficient that is a value acquired by subtracting the selected index S6 from 1 and is a value close to 0. As a result, the ride comfort control is prioritized over the posture stability control. Then, the steering angle, the brake hydraulic pressure, and the engine torque are acquired from, for example, the transmission from the CAN 8.

On the other hand, when the undulation/bobbing index is small and the turning level or the acceleration/deceleration level is high, it may be desirable to prioritize the posture stability control to prioritize the posture stability.

In this case, any of the turning index S1 relating to the absolute value of the steering angle, the deceleration index S2 relating to the brake hydraulic pressure, and the acceleration index S3 relating to the differential of the engine torque has a value close to 0. Therefore, the turning/acceleration/deceleration index S4, which is the result of multiplication of these three indexes, has a value close to 0. Further, because the undulation/bobbing index is small, the converted undulation/bobbing index S5 based on the undulation/bobbing index also has a value close to 0. The selected index S6 is set to an index having a larger value selected from the turning/acceleration/deceleration index S4 and the converted undulation/bobbing index S5, and therefore has a value close to 0. At this time, the output of the ride comfort control portion 25 (the ride comfort control instruction) is multiplied by a coefficient that is the selected index S6 and is a value close to 0. On the other hand, the output of the posture stability control portion 26 (the posture stability control instruction) is multiplied by a coefficient that is a value acquired by subtracting the selected index S6 from 1 and is a value close to 1. As a result, the posture stability control is prioritized over the ride comfort control.

Figure 14:
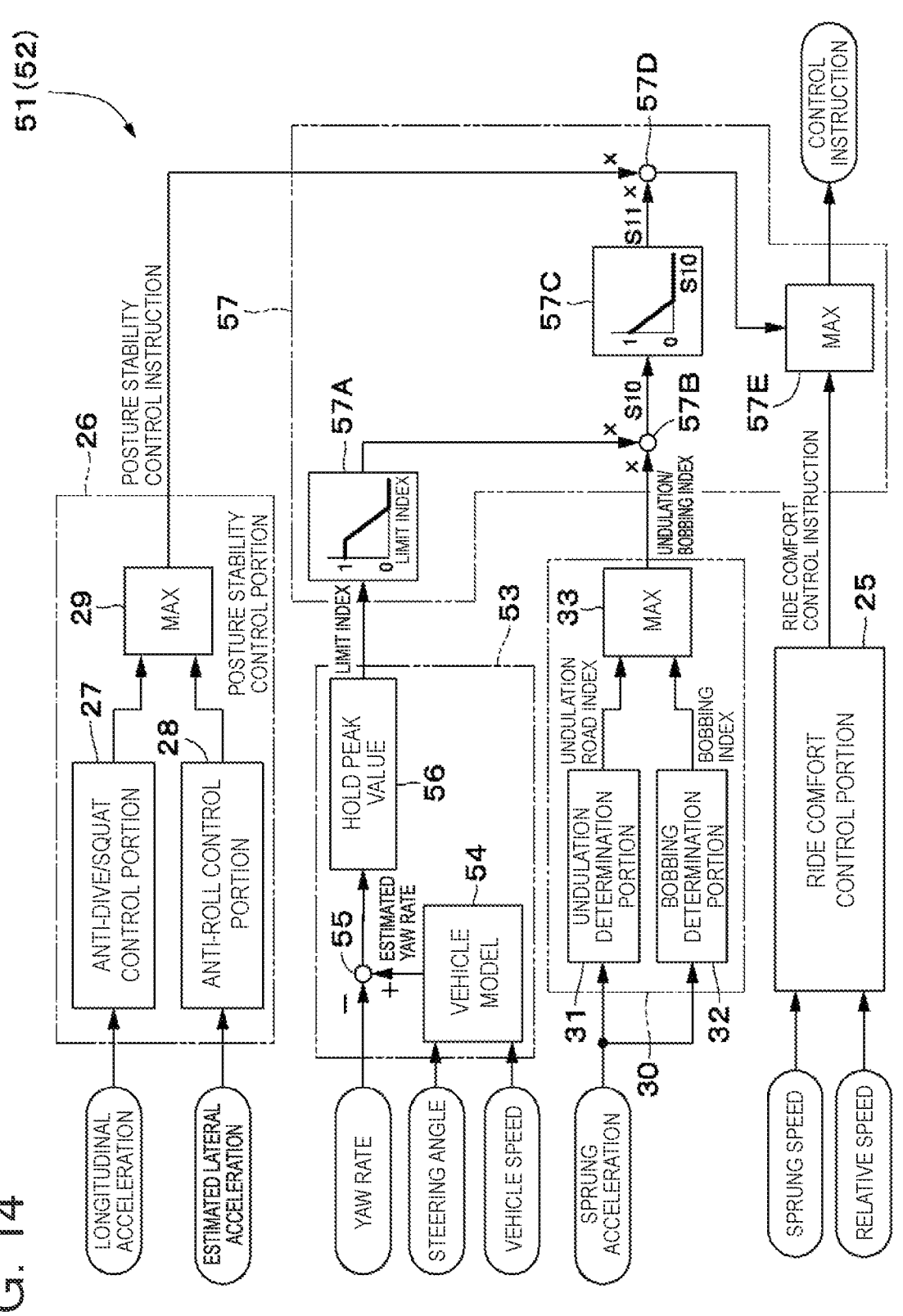
FIG. 14 is a block diagram illustrating the configuration of an ECU according to a third embodiment.

Next, FIGS. 1, 2, and 14 illustrate a third embodiment of the present invention. The third embodiment is characterized by being configured to maintain the posture stability control to ensure maneuvering stability to avoid danger in a limit state. The third embodiment will be described, indicating similar components to the above-described first embodiment by the same reference numerals and omitting descriptions thereof.

An ECU 51 according to the third embodiment is configured approximately similarly to the ECU 21 according to the first embodiment. The ECU 51 constitutes the vehicle control apparatus that controls the suspension apparatus 4. The ECU 51 is a controller that controls the force to be generated by the variable damper 6 (the force generation mechanism). The ECU 51 includes a processor 52 serving as a control portion. The processor 52 is realized using, for example, a microcomputer. The processor 52 controls the damping force of the variable damper 6 by executing a program stored in a storage portion (not illustrated). As illustrated in FIG. 2, the input side of the ECU 51 is connected to the CAN 8, the sprung acceleration sensor 9, the unsprung acceleration sensor 10, and the like, and the output side thereof is connected to the variable damper 6 and the like.

The ECU 51 includes the vehicle model 23 and the vehicle behavior calculation portion 24 similarly to the ECU 21 according to the first embodiment. In addition thereto, the ECU 51 includes the ride comfort control portion 25, the posture stability control portion 26, the undulation/bobbing index calculation portion 30, a limit index calculation portion 53, and an instruction value calculation portion 57 (refer to FIG. 14).

The limit index calculation portion 53 includes a vehicle model 54, a subtractor 55, and a peak value holding portion 56. The yaw rate, the steering angle, and the vehicle speed are input to the limit index calculation portion 53 via the CAN 8. The vehicle model 54 estimates the vehicle behavior based on the steering angle and the vehicle speed. More specifically, the vehicle model 54 estimates the yaw rate of the vehicle based on the steering angle and the vehicle speed, and outputs an estimated yaw rate. The subtractor 55 subtracts the yaw rate acquired from the CAN 8 from the estimated yaw rate, thereby calculating a yaw rate difference, which is a difference therebetween. The peak value holding portion 56 holds, for example, a maximum value of the absolute value of the yaw rate difference, and outputs a limit index corresponding to this maximum value. The limit index calculation portion 53 outputs the limit index.

The instruction value calculation portion 57 determines the instruction value directed to the variable damper 6 (the actuator) based on both the instruction values of the posture stability control portion 26 and the ride comfort control portion 25. When the change in the posture of the vehicle is equal to or larger than the predetermined value and the sprung vibration in the sprung resonance frequency band is larger than the predetermined value, the instruction value calculation portion 57 prioritizes the instruction value of the ride comfort control portion 25. The instruction value calculation portion 57 constitutes the correction portion. The instruction value calculation portion 57 weakens the instruction value of the posture stability control portion 26 (the posture stability control instruction) so as to prioritize the instruction value of the ride comfort control portion 25 (the ride comfort control instruction).

The instruction value calculation portion 57 includes conversion tables 57A and 57C, multipliers 57B and 57D, and a control instruction selection portion 57E. The conversion table 57A calculates a damping coefficient by converting the limit index into a value from 0 to 1. A large value (a value close to 1) is acquired as the damping coefficient when the limit index is small, and a small value (a value close to 0) is acquired as the damping coefficient when the limit index is large. In other words, the damping coefficient reduces from 1 to 0 as the limit index increases. The multiplier 57B calculates a product of the damping coefficient and the undulation/bobbing index, and outputs a damped undulation/bobbing index S10. Therefore, the damped undulation/bobbing index S10 has a small value when the damping coefficient has a value close to 0. The damped undulation/bobbing index S10 has a large value when the damping coefficient has a value close to 1.

The conversion table 57C calculates a converted index S11 by converting the damped undulation/bobbing index S10 into a value from 0 to 1. A large value (a value close to 1) is acquired as the converted index S11 when the damped undulation/bobbing index S10 is small, and a small value (a value close to 0) is acquired as the converted index S11 when the damped undulation/bobbing index S10 is large. In other words, the converted index S11 reduces from 1 to 0 as the damped undulation/bobbing index S10 increases. The multiplier 57D multiplies the posture stability control instruction by the converted index S11 and outputs a corrected posture stability control instruction. Therefore, the corrected posture stability control instruction has a small value when the converted index S11 has a value close to 0. The corrected posture stability control instruction has a large value when the converted index S11 has a value close to 1.

The control instruction selection portion 57E compares the ride comfort control instruction and the corrected posture stability control instruction, and selects a control instruction having a larger value. The control instruction selection portion 57E outputs the selected control instruction as the final control instruction. More specifically, the control instruction selection portion 57E selects a hard-side value from the ride comfort control instruction and the corrected posture stability control instruction. At this time, the instruction value calculation portion 34 performs the same processing with respect to the respective control instructions for the four wheels. A driving current based on the final control instruction is supplied to the damping force variable actuator 7 of the variable damper 6. As a result, the damping force of the variable damper 6 is controlled by the ECU 21 (the processor 22).

In this manner, the thus-configured third embodiment can also bring about advantageous effects similar to the first embodiment. In the third embodiment, the instruction value calculation portion 57 prioritizes the instruction value of the posture stability control portion 26 (the posture stability control instruction) regardless of the sprung vibration when the change in the posture of the vehicle exceeds the value for prioritizing the posture stability. At this time, whether the change in the posture of the vehicle reaches the value for prioritizing the posture stability is determined based on whether the vehicle is in a limit state.

Further, in the limit state, a difference (the yaw rate difference) increases between the estimated yaw rate estimated from the steering angle and the vehicle speed using the vehicle model 54 and the actual yaw rate transmitted from the CAN 8. Therefore, in the third embodiment, the peak value of this yaw rate difference is held and used as the limit index. When the limit index is large, the damping coefficient, which is the output value of the conversion table 57A, has a value close to 0, and the damped undulation/ bobbing index S10, which is the product of the damping coefficient and the undulation/bobbing index, has a value close to 0. As a result, the conversion table 57C relating to the damped undulation/bobbing index S10 outputs a value (the converted index S11) closer to 1. The posture stability control instruction is multiplied by this converted index S11. At this time, since the converted index S11 is close to 1, the output of the posture stability control instruction is maintained. Therefore, the posture stability control can be prioritized when the vehicle is brought into the limit state.

On the other hand, unless the vehicle is in the limit state, the difference (the yaw rate difference) reduces between the yaw rate and the estimated yaw rate. At this time, 0 is acquired as the limit index, and 1 is acquired as the damping coefficient. Therefore, the undulation/bobbing index and the damped undulation/bobbing index have equal values, and the conversion table 57C relating to the damped undulation/bobbing index S10 outputs a value (the converted index S11) closer to 0 when the undulation/bobbing index is large. Since the output value of the posture stability control portion 26 (the posture stability control instruction) is multiplied by this converted index S11, a small value can be acquired as the posture stability control similarly to the first embodiment. Therefore, the ride comfort control, which determines excitation/damping according to the relative speed and calculates the control instruction, is prioritized. As a result, the vibration damping performance is improved.

Each of the above-described embodiments has been described, citing the example in which the semi-active suspension is provided using the variable damper 6, which is the actuator (the force generation mechanism). The present invention is not limited thereto, and the actuator may be used to provide an active suspension that generates a vertical force between the vehicle body and the wheel. More specifically, the actuator is embodied by an electric actuator, a hydraulic actuator, or the like that generates a force in the extension direction or the compression direction between the vehicle body and the wheel. In this case, when the change in the posture of the vehicle is not equal to or larger than the predetermined value and the generated force of the actuator is saturated, and the sprung vibration in the sprung resonance frequency band is larger than the predetermined value, the instruction value calculation portion of the ECU prioritizes the instruction value of the ride comfort control portion. As a result, even when the vehicle is, for example, turned, braked, or driven on the undulation road, the ride comfort control instruction can be prioritized and the vibration damping performance can be improved.

Each of the above-described embodiments has been described, citing the example in which the actuator (the force generation mechanism) that generates the adjustable force between the vehicle body 1 and the wheel 2 is embodied by the damping force adjustable variable damper 6. The present invention is not limited thereto, and, for example, the actuator may be embodied by an air suspension, a stabilizer (a kinetic suspension), an electromagnetic suspension, or the like besides the hydraulic shock absorber.

In each of the above-described embodiments, the posture stability control portion 26 is assumed to output the posture stability control instruction in consideration of both the anti-dive/squat control instruction and the anti-roll control instruction. The present invention is not limited thereto, and the posture stability control portion may output the posture stability control instruction based on any one of the anti-dive/squat control instruction and the anti-roll control instruction. In other words, the posture stability control instruction may be the anti-dive/squat control instruction or may be the anti-roll control instruction. As such, the posture stability control portion may be configured not to include any one of the anti-dive/squat control portion and the anti-roll control portion.

Each of the above-described embodiments has been described, citing the suspension system used together with the four-wheeled automobile by way of example. However, the present invention is not limited thereto, and can also be applied to, for example, a two-wheeled or three-wheeled automobile, or a truck, bus, or the like working as a service vehicle or a transporter vehicle.

Each of the above-described embodiments is only an example, and the configurations indicated in the different embodiments and the modifications can be partially replaced or combined.

Next, the vehicle control apparatus and the vehicle control system included in the above-described embodiments can have, for example, the following configurations.

As a first configuration, a vehicle control apparatus is configured to control an actuator provided between a vehicle body and a wheel of a vehicle. The actuator is configured to change a force for suppressing a relative displacement between the vehicle body and the wheel. The vehicle control apparatus includes a posture stability control portion configured to determine an instruction value for controlling the actuator according to an input change in a posture of the vehicle, a ride comfort control portion configured to determine an instruction value for controlling the actuator according to an input sprung vibration of the vehicle, and an instruction value calculation portion configured to determine an instruction value directed to the actuator based on both the instruction values of the posture stability control portion and the ride comfort control portion. The instruction value calculation portion prioritizes the instruction value of the ride comfort control portion when a value indicating the change in the posture of the vehicle is equal to or larger than a predetermined value and a value indicating a sprung vibration in a sprung resonance frequency band is larger than a predetermined value. Due to this configuration, even when the vehicle is, for example, turned, braked, or driven on an undulation road, the ride comfort control instruction can be prioritized and the vibration damping performance can be improved.

As a second configuration, in the first configuration, the instruction value calculation portion includes a correction portion configured to weaken the instruction value of the posture stability control portion so as to prioritize the instruction value of the ride comfort control portion. Due to this configuration, when the change in the posture of the vehicle is equal to or larger than the predetermined value and the sprung vibration in the sprung resonance frequency band is higher than the predetermined value, the posture stability control instruction can be set to a small value and the ride comfort control instruction can be prioritized.

As a third configuration, in the first or second configuration, the instruction value calculation portion prioritizes the instruction value of the posture stability control portion regardless of the sprung vibration when the value indicating the change in the posture of the vehicle exceeds a value for prioritizing posture stability. Therefore, the posture stability control can be prioritized when the vehicle is brought into a limit state.

As a fourth configuration, in any of the first to third configurations, the actuator is used to provide an active suspension configured to generate a vertical force between the vehicle body and the wheel. The instruction value calculation portion prioritizes the instruction value of the ride comfort control portion when the value indicating the change in the posture of the vehicle is not equal to or larger than the predetermined value and the generated force of the actuator is saturated, and the value indicating the sprung vibration in the sprung resonance frequency band is larger than the predetermined value. Due to this configuration, even when a vehicle including an active suspension is, for example, turned, braked, or driven on an undulation road, the ride comfort control instruction can be prioritized and the vibration damping performance can be improved.

According to a fifth configuration, a vehicle control system includes a force generation mechanism configured to adjust a force between a vehicle body and a wheel of a vehicle, a sprung state detection portion configured to detect or estimate a sprung vibration, a vehicle posture detection portion configured to detect or estimate a change in a sprung posture, and a controller configured to perform control so as to weaken the force to be generated by the force generation mechanism when a value indicating the change in the sprung posture and a value indicating a sprung vibration in a sprung resonance frequency band transition from smaller states to larger states than respective predetermined values. Due to this configuration, even when the vehicle is, for example, turned, braked, or driven on an undulation road, the vibration damping performance can be improved by weakening the force to be generated by the forge generation mechanism.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2021-113253 filed on Jul. 8, 2021. The entire disclosure of Japanese Patent Application No. 2021-113253 filed on Jul. 8, 2021 including the specification, the claims, the drawings, and the abstract is incorporated herein by reference in its entirety.

REFERENCE SIGNS LIST 1 vehicle body
2 wheel
4 suspension apparatus
6 variable damper (damping force adjustable shock absorber, actuator, force generation mechanism)
7 damping force variable actuator
8 CAN
9 sprung acceleration sensor (sprung state detection unit)
10 unsprung acceleration sensor
21, 41, 51 ECU (vehicle control apparatus, controller)
23 vehicle model (vehicle state detection unit)

The invention claimed is:

1. A vehicle control apparatus configured to control an actuator provided between a vehicle body and a wheel of a vehicle, the actuator being configured to change a force for suppressing a relative displacement between the vehicle body and the wheel, the vehicle control apparatus comprising:
   a posture stability control portion configured to determine an instruction value for controlling the actuator according to an input change in a posture of the vehicle;
   a ride comfort control portion configured to determine an instruction value for controlling the actuator according to an input sprung vibration of the vehicle; and an instruction value calculation portion configured to determine an instruction value directed to the actuator based on both the instruction values of the posture stability control portion and the ride comfort control portion,
   wherein the instruction value calculation portion prioritizes the instruction value of the ride comfort control portion when a value indicating the change in the posture of the vehicle is equal to or larger than a predetermined value and a value indicating a sprung vibration extracted from within a sprung resonance frequency band is larger than a predetermined value, and also prioritizes the instruction value of the posture stability control portion regardless of the sprung vibration when the value indicating the change in the posture of the vehicle exceeds a value for prioritizing posture stability.

2. The vehicle control apparatus according to claim 1, wherein the instruction value calculation portion includes a correction portion configured to weaken the instruction value of the posture stability control portion so as to prioritize the instruction value of the ride comfort control portion.

3. The vehicle control apparatus according to claim 1, wherein the actuator is used to provide an active suspension configured to generate a vertical force between the vehicle body and the wheel, and
   wherein the instruction value calculation portion prioritizes the instruction value of the ride comfort control portion when the value indicating the change in the posture of the vehicle is not equal to or larger than the predetermined value and the generated force of the actuator is saturated, and the value indicating the sprung vibration in the sprung resonance frequency band is larger than the predetermined value.

4. A vehicle control system comprising:
   a force generation mechanism configured to adjust a force between a vehicle body and a wheel of a vehicle;
   a sprung state detection portion configured to detect or estimate a sprung vibration;
   a vehicle posture detection portion configured to detect or estimate a change in a sprung posture; and
   a controller configured to perform control
      so as to weaken the force to be generated by the force generation mechanism when a value indicating the change in the sprung posture and a value indicating a sprung vibration extracted from within a sprung resonance frequency band transition from smaller states to larger states which are larger than respective predetermined values, and
      so as to increase the force to be generated by the force generation mechanism when the value indicating the change in the posture of the vehicle transitions to a large state exceeding a value for prioritizing posture stability.

5. A vehicle control apparatus configured to control an actuator provided between a vehicle body and a wheel of a vehicle, the actuator being configured to change a force for damping a relative displacement between the vehicle body and the wheel, the vehicle control apparatus comprising:
   a posture stability control portion configured to determine an instruction value for controlling the actuator according to an input change in a posture of the vehicle;
   a ride comfort control portion configured to determine an instruction value for controlling the actuator according to an input sprung vibration of the vehicle; and
   an instruction value calculation portion configured to determine an instruction value directed to the actuator based on both the instruction values of the posture stability control portion and the ride comfort control portion, wherein the instruction value calculation portion prioritizes the instruction value of the ride comfort control portion by multiplying the instruction value of the posture stability control portion by an index that reduces as a sprung acceleration of the vehicle increases when a value indicating the change in the posture of the vehicle is equal to or larger than a predetermined value and a value indicating a sprung vibration extracted from within a sprung resonance frequency band is larger than a predetermined value.

6. The vehicle control apparatus according to claim 5, wherein the instruction value calculation portion includes a correction portion configured to weaken the instruction value of the posture stability control portion so as to prioritize the instruction value of the ride comfort control portion, and wherein the instruction value of the posture stability control portion is multiplied by the index by the correction portion.

7. The vehicle control apparatus according to claim 5, wherein the instruction value calculation portion prioritizes the instruction value of the posture stability control portion regardless of the sprung vibration when the value indicating the change in the posture of the vehicle exceeds a value for prioritizing posture stability.

8. The vehicle control apparatus according to claim 5, wherein the actuator is used to provide an active suspension configured to generate a vertical force between the vehicle body and the wheel, and wherein the instruction value calculation portion prioritizes the instruction value of the ride comfort control portion when the value indicating the change in the posture of the vehicle is not equal to or larger than the predetermined value and a generated force of the actuator is saturated, and the value indicating the sprung vibration in the sprung resonance frequency band is larger than the predetermined value.

9. A vehicle control system comprising:

a force generation mechanism configured to adjust a force between a vehicle body and a wheel of a vehicle;

a sprung state detection portion configured to detect or estimate a sprung vibration;

a vehicle posture detection portion configured to detect or estimate a change in a sprung posture; and a controller configured to perform control so as to weaken the force to be generated by the force generation mechanism by multiplying a value indicating the change in the sprung posture by an index that reduces as a sprung vibration of the vehicle increases when the value indicating the change in the sprung posture and a value indicating a sprung vibration extracted from within a sprung resonance frequency band transition from smaller states to larger states which are larger than respective predetermined values.

* * * * *